United States Patent [19]

Wang

[11] Patent Number: 5,120,684
[45] Date of Patent: Jun. 9, 1992

[54] PRESSURE ASSISTED TECHNIQUE FOR FORMING SELF-SUPPORTING COMPOSITE BODIES AND ARTICLES FORMED THEREBY

[75] Inventor: James C. Wang, Newark, Del.

[73] Assignee: Lanxide Technology Company, LP, Newark, Del.

[21] Appl. No.: 551,289

[22] Filed: Jul. 12, 1990

[51] Int. Cl.[5] .................................... C04B 35/58
[52] U.S. Cl. ........................................ 501/96; 501/87
[58] Field of Search ............... 501/96, 98, 92; 264/62, 264/65; 419/13

[56] References Cited

U.S. PATENT DOCUMENTS

| | | | |
|---|---|---|---|
| 3,758,662 | 9/1973 | Tobin et al. | 264/332 |
| 3,864,154 | 2/1975 | Gazza et al. | 29/123 B |
| 4,353,714 | 10/1982 | Lee et al. | 419/57 X |
| 4,471,059 | 9/1984 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,545 | 1/1986 | Sane | 264/65 |
| 4,605,440 | 8/1986 | Halverson et al. | 75/238 |
| 4,692,418 | 8/1987 | Boecker et al. | 501/90 |
| 4,702,770 | 10/1987 | Pyzik et al. | 75/236 |
| 4,713,360 | 12/1987 | Newkirk et al. | 501/87 |
| 4,718,941 | 1/1988 | Halverson et al. | 75/236 |
| 4,777,014 | 10/1988 | Newkirk et al. | 419/12 |
| 4,793,968 | 12/1988 | Mosser et al. | 419/17 X |
| 4,885,131 | 12/1989 | Newkirk | 412/12 |
| 4,904,446 | 2/1990 | White et al. | 419/13 |
| 4,929,417 | 5/1990 | Watanabe et al. | 419/12 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1987 | United Kingdom . |

Primary Examiner—William R. Dixon, Jr.
Assistant Examiner—Alan Wright
Attorney, Agent, or Firm—Mark G. Mortenson; Stanislav Antolin

[57] ABSTRACT

This invention relates generally to a novel method of forming self-supporting bodies and the novel products made thereby. In its more specific aspects, this invention relates to a method of producing self-supporting bodies comprising one or more boron-containing compounds by reacting a powdered parent metal with a bed or mass comprising a boron source material and a carbon source material (e.g., boron carbide) and/or boron source material and a nitrogen source material (e.g., boron nitride) and, optionally, one or more inert fillers. More specifically, the reaction occurs under the application of an externally applied pressure.

20 Claims, 2 Drawing Sheets

Fig. 2
Fig. 3

PRESSURE ASSISTED TECHNIQUE FOR FORMING SELF-SUPPORTING COMPOSITE BODIES AND ARTICLES FORMED THEREBY

FIELD OF THE INVENTION

This invention relates generally to a novel method of forming self-supporting bodies and the novel products made thereby. In its more specific aspects, this invention relates to a method of producing self-supporting bodies comprising one or more boron-containing compounds by reacting a powdered parent metal with a bed or mass comprising a boron source material and a carbon source material (e.g., boron carbide) and/or boron source material and a nitrogen source material (e.g., boron nitride) and, optionally, one or more inert fillers. More specifically, the reaction occurs under the application of an externally applied pressure.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENTS AND PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of Danny R. White, Michael K. Aghajanian and T. Dennis Claar, and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

Copending U.S. patent application Ser. No. 07/296,837 (hereinafter referred to as "Application '837"), filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in copending U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in Commonly Owned U.S. Pat. No. 5,004,714 (hereinafter "Patent '714") which issued Apr. 2, 1991, from U.S. patent application Ser. No. 07/296,966, filed in the names of Terry Dennis Claar et al., on Jan. 13, 1989, and entitled "A Method of Modifying Ceramic Composite Bodies By Post-Treatment Process and Articles Produced Thereby". Specifically, Application '966 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

Commonly Owned U.S. Pat. No. 5,019,539 (hereinafter "Patent '539") which issued May 28, 1991, from U.S. patent application Ser. No. 07/296,961, filed in the names of Terry Dennis Claar et al., on Jan. 13, 1989, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

In accordance with the present invention self-supporting ceramic bodies are produced by mixing a powdered parent metal together with a bed or mass which is reactive with the powdered parent metal and heating the mixture to an appropriate temperature in an inert atmosphere to cause the powdered parent metal to react with the permeable mass. During reaction, an external pressure is applied to assist the reaction.

Stated more specifically, a powdered parent metal is admixed in a desirable amount with a material comprising a boron source material and a carbon source material (e.g., boron carbide) and/or a boron source material and a nitrogen source material (e.g., boron nitride) and, optionally, one or more inert fillers. The mixture is heated to a temperature above the melting point of the powdered parent metal causing the parent metal to react with the permeable mass to form one or more reaction products of parent metal boron-containing compounds and/or one or more parent metal carbon-containing compounds and/or one or more parent metal nitrogen-containing compounds, etc. The particle size of the powdered parent metal may be in direct correlation with the pore size which forms in the self-supporting body without the application of an external pressure. Accordingly, smaller powdered parent metal particles may not require the use of as high an external pressure as larger parent metal particles.

Moreover, rather than forming a loose bed or a permeable mass from the mixture, the mixture may be formed into any desired shape. For example, the mixture may be formed into a preform which is self-supporting or the mixture may be contained within a mold which assists in the shaping of the formed self-supporting body.

The external pressure which is applied during at least a portion of the reaction process can be mechanically applied by, for example, a physical means. Alternatively, if the reaction is contained in an appropriate chamber, the chamber could be pressurized resulting in a pressure being applied to the mixture. Moreover, any conventional pressurizing means capable of withstanding the rigors of the formation process could be used in accordance with the present invention.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride, parent metal nitride, or other parent metal compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between (1) boron nitride, (2) boron carbide, (3) a boron source and (4) mixtures thereof and the parent metal and includes a binary compound of boron with the parent metal as well as ternary or higher order compounds.

"Parent metal nitride" means a reaction product containing nitrogen formed upon reaction of boron nitride and parent metal.

"Parent metal carbide" means a reaction product containing carbon formed upon reaction of a carbon source and parent metal.

BRIEF DESCRIPTION OF THE DRAWINGS

FIG. 2 is a photograph of a cross-section of the formed platelet reinforced composite body; and FIG. 3 is an approximately 200× magnification photomicrograph of the formed platelet reinforced composite body.

DETAILED DESCRIPTION OF THE INVENTION AND PREFERRED EMBODIMENTS

Figure 1:
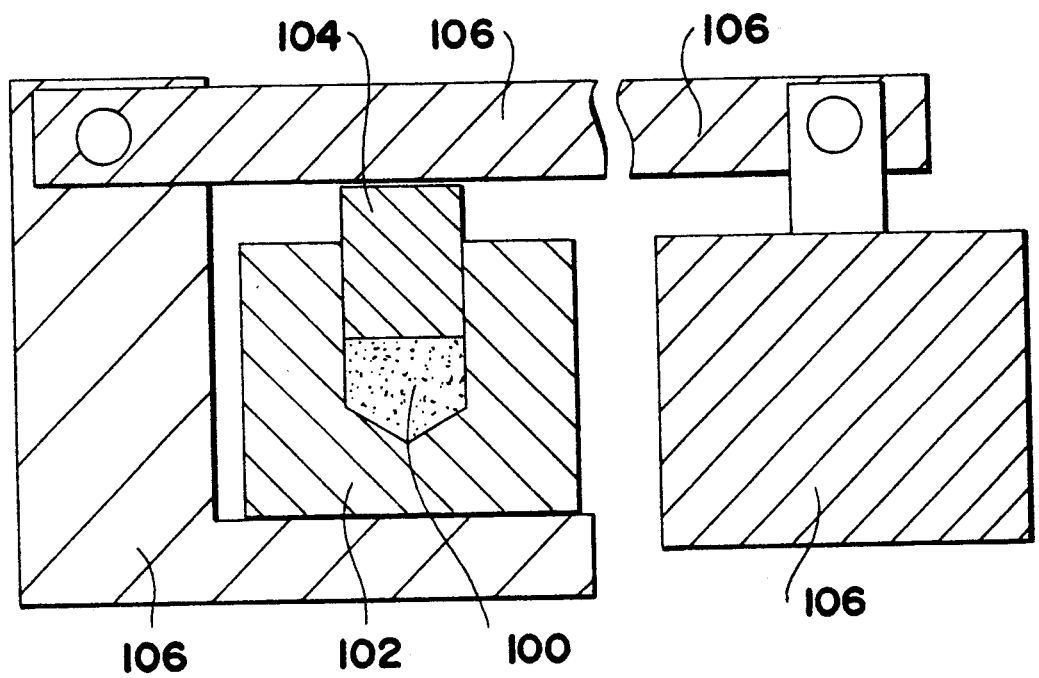
FIG. 1 is a schematic view of the setup used in carrying out the pressure assisted composite fabrication process.

In accordance with the present invention self-supporting ceramic bodies are produced by mixing a powdered parent metal together with a bed or mass which is reactive with the powdered parent metal and heating the mixture to an appropriate temperature in an inert atmosphere to cause the powdered parent metal to react with the permeable mass. During reaction, an external pressure is applied to assist the reaction.

Stated more specifically, a powdered parent metal is admixed in a desirable amount with a material comprising a boron source material and a carbon source material (e.g., boron carbide) and/or a boron source material and a nitrogen source material (e.g., boron nitride) and, optionally, one or more inert fillers. The mixture is heated to a temperature above the melting point of the powdered parent metal causing the parent metal to react with the permeable mass to form one or more reaction products of parent metal boron-containing compounds and/or one or more parent metal carbon-containing compounds and/or one or more parent metal nitrogen-containing compounds, etc. The particle size of the powdered parent metal may be in direct correlation with the pore size which forms in the self-supporting body without the application of an external pressure. Accordingly, smaller powdered parent metal particles may not require the use of as high an external pressure as larger parent metal particles.

Moreover, rather than forming a loose bed or a permeable mass from the mixture, the mixture may be formed into any desired shape. For example, the mixture may be formed into a preform which is self-supporting or the mixture may be contained within a mold which assists in the shaping of the formed self-supporting body.

The external pressure which is applied during at least a portion of the reaction process can be mechanically applied by, for example, a physical means. Alternatively, if the reaction is contained in an appropriate chamber, the chamber could be pressurized resulting in a pressure being applied to the mixture. Moreover, any conventional pressurizing means capable of withstanding the rigors of the formation process could be used in accordance with the present invention.

The following are examples of the present invention. The Examples are intended to be illustrative of various aspects of the present invention, however, these examples should not be construed as limiting the scope of the invention.

EXAMPLE 1

This Example demonstrates a technique for forming a dense platelet reinforced composite body at a slightly lower than normal temperature by means of an externally applied pressure during the of parent metal with a boron carbide solid oxidant. Platelet reinforced composite bodies formed from particulate admixtures of zirconium and boron carbide often have a residual porosity. Through application of an external pressure during the composite forming process, this residual porosity is greatly diminished. The setup employed in carrying out this pressure assisted composite fabrication process is shown in FIG. 1.

About 21.29 grams of TETRABOR ® 1000 grit (average particle diameter of about 5 μm) boron carbide particulate (ESK Engineered Ceramics, New Canaan, Conn.) and about 290.38 grams of −325 mesh (particle diameter less than about 45 μm) zirconium particulate (Teledyne Wah Chang Albany, Albany, Oreg.) were placed into a NALGENE ® plastic bottle and roll mixed on a mill rack for about 45 minutes. The roll mixed powders were then transferred to a stainless steel milling jar containing some stainless steel ball milling media. The powders were ball milled for about two hours at a rotational speed of about 85 rpm. The stainless steel ball milling media were removed and about 6.23 grams of ACRAWAX ® C bisamide wax (Lonza, Inc., Fairlawn, N.J.) was added to the steel milling jar and roll mixed into the particulate admixture for about ½ hour.

The roll mixed particulate admixture was placed into a grade ATJ graphite crucible (Union Carbide Corporation, Carbon Products Division, Cleveland, Ohio) measuring about 2 inches (51 mm) square in its interior and about 3 inches (76 mm) tall. The graphite mold and its contents was placed into an evacuable vacuum furnace. The evacuable furnace chamber was evacuated and then back with argon gas. After repeating this evacuation and back-filling procedure, an argon gas flow rate of about two liters per minute was established. The gas pressure in the evacuable furnace chamber was about 1 psig (0.07 Kg/cm$^2$). The evacuable furnace temperature was then increased from about room temperature of about 250° C. at a rate of about 100° C. per hour. Upon reaching about 250° C., the temperature was then increased to about 600° C. at a rate of about 50° C. per hour. After maintaining a temperature of about 600° C. for about an hour to volatilize the wax, the temperature was decreased at a rate of about 100° C. per hour. Upon reaching a temperature of about 55° C., the evacuable furnace door was opened and the graphite crucible and its contents was removed. The contents of the graphite crucible, namely the boron carbide and the zirconium metal particulates, were poured into a pestle and was broken down again to a fine powder under the action of the mortar. The reground particulate admixture 100 was then placed into a graphite pressing die 102 whose interior measured about 0.75 inch (19 mm) in diameter by about 2.5 inches (64 mm) deep and was countersunk at one end. The graphite die 102 and its contents were then placed into a chamber of a tap volume meter (Model 2003, Stampfvolumeter, J. Engelsmann, A. G., Federal Republic of Germany) and tapped about 150 times to consolidate the powder admixture. A graphite punch 104 about 0.75 inch (19 mm) in diameter by about 3.0 inches (76 mm) long was placed into the graphite die cavity on top of the tapped bed of particulate material 100 and pressed uniaxially to a pressure of about 1,220 psi (85.8 Kg/cm$^2$) to form a lay-up.

The lay-up comprising the graphite die 102, punch 104 and the pressed powder admixture 100 was then placed into a graphite jig 106 in a vacuum furnace such that a constant stress of about 150 psi (10.5 Kg/cm$^2$) was continually applied through a lever arrangement (see FIG. 1). About 200 grams of hafnium sponge was spread evenly between about four (4) graphite containers. The graphite containers and their contents were then placed in strategic locations around the vacuum furnace chamber to serve as oxygen getters during the furnace run. The vacuum furnace chamber was evacuated to about 30 inches (762 mm) of mercury vacuum, back-filled with argon gas, and then evacuated once more (with assistance from a high vacuum source) to a final working pressure of about $4 \times 10^{-4}$ torr. The vacuum furnace temperature was then increased from about room temperature to a temperature of about 1900° C. at a rate of about 400° C. per hour. Upon reaching a temperature of about 1000° C., the high vacuum source was isolated from the vacuum chamber and the remainder of the furnace run was carried out under the vacuum maintained by a mechanical roughing pump. After maintaining a temperature of about 1900° C. for about two hours, the reaction of the zirconium metal with the boron carbide particulate to form a platelet reinforced composite was substantially complete. Accordingly, the vacuum furnace temperature was decreased at a rate of about 330° C. per hour. Upon cooling to substantially room temperature, the vacuum furnace door was opened, the load on the graphite die 102 and punch 104 assembly was relieved, and the lay-up was removed from the vacuum furnace and disassembled. A platelet reinforced composite body was recovered.

A vertical cross-section of the platelet reinforced composite body was made by electro-discharge machining. The vertical cross-section was then mounted and polished for microstructural examination. FIG. 2 is a photograph taken at about 1× showing the mounted cross-section of the platelet reinforced body. Specifically FIG. 2 shows that the platelet reinforced body's outer surface replicated the inner surface of the graphite die. FIG. 3 is an backscatter electron image photomicrograph taken at about 200× in a scanning electron microscope revealing the microstructure of the formed platelet reinforced composite body which comprises zirconium diboride, zirconium carbide, and residual zirconium alloy. Quantitative image analysis showed that the body achieved a density of about 99.0% of theoretical. Using the same technique, the residual metal content of the composite was estimated to be about 23.0 percent by volume.

What is claimed is:

1. A method for producing a self-supporting body, comprising:

mixing a particulate parent metal with a boron source material comprising at least one material selected from the group consisting of boron carbide and boron nitride, to form a reaction mixture; heating said reaction mixture to a temperature above the melting temperature of said parent metal but below the ignition temperature of said parent metal and reacting said particulate parent metal with said boron source material in a substantially inert atmosphere to form at least one boron-containing compound;

applying an external pressure to said reaction mixture; and continuing said reaction for a time sufficient to produce a self-supporting body containing at least one parent metal boron-containing compound.

2. A method for producing a self-supporting body, comprising:

mixing a particulate parent metal with a boron source material and a carbon source material, or a boron source material and a nitrogen source material to form a reaction mixture; heating said reaction mixture to a temperature above the melting temperature of said parent metal but below the ignition temperature of said parent metal and reacting said particulate parent metal with said boron source material in a substantially inert atmosphere to form at least one boron-containing compound;

applying an external pressure to said reaction mixture; and continuing said reaction for a time sufficient to produce a self-supporting body containing at least one parent metal boron-containing compound.

3. The method of claim 1, wherein the boron source material comprises boron carbide and boron nitride.

4. The method of claim 2, wherein the boron source material and carbon source material both comprise boron carbide.

5. The method of claim 2, wherein the boron source material and nitrogen source material both comprise boron nitride.

6. The method of claim 1, wherein the particulate parent metal comprises at least one parent metal selected from the group consisting of silicon, titanium, hafnium, lanthanum, iron, calcium, zirconium, vanadium, niobium, magnesium and beryllium.

7. The method of claim 6, wherein the particulate parent metal comprises at least one parent metal selected from the group consisting of hafnium, titanium and zirconium.

8. The method of claim 2, wherein the particulate parent metal comprises at least one parent metal selected from the group consisting of silicon, titanium, hafnium, lanthanum, iron, calcium, zirconium, vanadium, niobium, magnesium and beryllium.

9. The method of claim 8, wherein the particulate parent metal comprises at least one parent metal selected from the group consisting of hafnium, titanium and zirconium.

10. The method of claim 1, wherein the external pressure is applied mechanically or by pressurizing an appropriate chamber containing the reaction mixture.

11. The method of claim 2, wherein the external pressure is applied mechanically or by pressurizing an appropriate chamber containing the reaction mixture.

12. The method of claim 1, wherein the boron source material is at least partially reacted and at least partially incorporated into said self-supporting body.

13. The method of claim 2, wherein said boron source material and carbon source material or said boron source material and nitrogen source material are at least partially reacted and at least partially incorporated into said self-supporting body.

14. The method of claim 1, wherein the boron source material is substantially completely reacted.

15. The method of claim 2, wherein the boron source material and carbon source material or the boron source material and nitrogen source material are substantially completely reacted.

16. The method of claim 1, wherein the reaction mixture further comprises at least one inert filler.

17. The method of claim 1, wherein the particulate parent metal comprises zirconium, the boron source material comprises boron carbide, and the at least one parent metal boron-containing compound comprises zirconium boride.

18. The method of claim 1, wherein the reaction mixture comprises a shaped preform and the self-supporting body comprises a shaped self-supporting body corresponding substantially to the shaped preform.

19. The method of claim 1, wherein the self-supporting body comprises a shaped self-supporting body formed within a mold and corresponding in shape substantially into shape to the mold.

20. The method of claim 19, wherein the mold comprises graphite.

* * * * *